(12) United States Patent
Park

(10) Patent No.: US 10,957,316 B2
(45) Date of Patent: Mar. 23, 2021

(54) ELECTRONIC APPARATUS, METHOD FOR CONTROLLING THEREOF AND COMPUTER READABLE RECORDING MEDIUM

(71) Applicant: SAMSUNG ELECTRONICS CO., LTD., Suwon-si (KR)

(72) Inventor: Gwi-rang Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 53 days.

(21) Appl. No.: 16/146,475

(22) Filed: Sep. 28, 2018

(65) Prior Publication Data
US 2019/0172455 A1 Jun. 6, 2019

(30) Foreign Application Priority Data
Dec. 4, 2017 (KR) .......................... 10-2017-0165364

(51) Int. Cl.
| | |
|---|---|
| *G10L 15/22* | (2006.01) |
| *H04N 21/422* | (2011.01) |
| *G06F 3/16* | (2006.01) |
| *G10L 25/78* | (2013.01) |

(52) U.S. Cl.
CPC .............. *G10L 15/22* (2013.01); *G06F 3/167* (2013.01); *G10L 25/78* (2013.01); *H04N 21/4221* (2013.01); *H04N 21/42203* (2013.01); *H04N 21/42222* (2013.01); *G10L 2015/223* (2013.01)

(58) Field of Classification Search
CPC ... G10L 15/22; G10L 25/78; G10L 2015/233; G10L 2015/223; G06F 3/167; H04N 21/42203; H04N 21/4221; H04N 21/42222
See application file for complete search history.

(56) References Cited

U.S. PATENT DOCUMENTS

| | | | | |
|---|---|---|---|---|
| 10,304,463 | B2* | 5/2019 | Mixter | .................... G10L 17/06 |
| 2006/0173681 | A1* | 8/2006 | Koch | ...................... G10L 17/00 |
| | | | | 704/246 |
| 2013/0035941 | A1 | 2/2013 | Kim et al. | |
| 2013/0246071 | A1* | 9/2013 | Lee | ........................ G06F 1/3206 |
| | | | | 704/275 |
| 2015/0012163 | A1* | 1/2015 | Crawley | ............. G05D 1/0248 |
| | | | | 701/23 |

(Continued)

FOREIGN PATENT DOCUMENTS

| | | |
|---|---|---|
| JP | 09-214947 A | 8/1997 |
| JP | 2009-130706 A | 6/2009 |

(Continued)

OTHER PUBLICATIONS

Communication dated Dec. 6, 2018, issued by the European Patent Office in counterpart European Application No. 18196973.4.
Communication dated Jun. 4, 2020 issued by the European Patent Office in counterpart European Patent Application No. 18 196 973.4.
Communication dated Jan. 20, 2021 issued by the European Patent Office in European Application No. 18196973.4.

Primary Examiner — Michelle M Koeth
(74) *Attorney, Agent, or Firm* — Sughrue Mion, PLLC

(57) ABSTRACT

An electronic apparatus is provided. The electronic apparatus includes a memory, a microphone and a processor configured to compare a volume of a voice input through the microphone and a standard voice volume stored in the memory, corresponding to a space in which the electronic apparatus is located, and identify whether to perform a voice recognition on the voice based on the comparison.

19 Claims, 9 Drawing Sheets

(56) References Cited

U.S. PATENT DOCUMENTS

| | | | |
|---|---|---|---|
| 2015/0162004 A1* | 6/2015 | Goesnar | G10L 17/00 |
| | | | 704/275 |
| 2015/0222948 A1 | 8/2015 | Wang et al. | |
| 2016/0204837 A1* | 7/2016 | Sol | H04W 4/80 |
| | | | 455/41.1 |
| 2016/0353173 A1 | 12/2016 | Du et al. | |
| 2017/0053649 A1 | 2/2017 | Choi et al. | |
| 2017/0069323 A1 | 3/2017 | Bae et al. | |
| 2017/0076721 A1* | 3/2017 | Bargetzi | G06F 3/167 |
| 2017/0242653 A1* | 8/2017 | Lang | G06F 3/162 |
| 2018/0268808 A1* | 9/2018 | Song | G10L 15/20 |
| 2020/0202868 A1* | 6/2020 | Reed | G10L 17/22 |

FOREIGN PATENT DOCUMENTS

| | | | | |
|---|---|---|---|---|
| KR | 10-2004-0107263 A | 12/2004 | | |
| KR | 10-2006-0008762 A | 1/2006 | | |
| WO | 2011/145030 A1 | 11/2011 | | |
| WO | WO-2017069556 A1 * | 4/2017 | | G10L 15/063 |

* cited by examiner

ELECTRONIC APPARATUS, METHOD FOR CONTROLLING THEREOF AND COMPUTER READABLE RECORDING MEDIUM

CROSS-REFERENCE TO RELATED APPLICATION(S)

This application is based on and claims priority under 35 U.S.C. § 119 to Korean Patent Application No. 10-2017-0165364, filed on Dec. 4, 2017, in the Korean Intellectual Property Office, the disclosure of which is incorporated herein by reference in its entirety.

BACKGROUND

Field

The disclosure relates to an electronic apparatus, a controlling method thereof, and a computer readable recording medium, and more particularly, to an electronic apparatus that automatically determines, from among a plurality of electronic apparatuses, an electronic apparatus to be controlled with voice recognition, a controlling method thereof, and a computer readable recording medium.

Description of Related Art

Many households have multiple televisions (TVs) in the same room, and many rooms within the same house have multiple TVs.

Various remote controlling methods have been used so that a user does not have to directly manipulate a button included in a TV. However, various problems exist with these methods when a TV to be controlled is in the same room as other TVs.

Specifically, when using a remote control that transmits an infrared ray (IR) signal, the transmission scope is very broad, and thus it is difficult to selectively transmit the signal to a specific TV. Accordingly, there is an inconvenience that multiple TVs in the operation scope of a remote controller operate based on an IR signal at the same time.

In addition, when using a remote control using a short range wireless technology such as Bluetooth, a number of Bluetooth remote controllers that are respectively paired with a number of TVs are required. Accordingly, there is an inconvenience that a user has to find the remote controller paired with the TV to be controlled and operate the remote controller.

In addition, if a voice signal is used, there is a problem that all TVs which could react to the same voice command.

Accordingly, there is a need of technology for controlling only one TV among a plurality of TVs.

SUMMARY

Provided is an electronic apparatus that automatically determines the electronic apparatus to be controlled with voice recognition from among a plurality of electronic apparatuses which could recognize a voice, a controlling method thereof, and a computer readable recording medium.

In accordance with an aspect of the disclosure, there is provided an electronic apparatus including: a memory; a microphone; and a processor configured to compare a volume of a voice input through the microphone and a standard voice volume stored in the memory, corresponding to a space in which the electronic apparatus is located, and identify whether to perform a voice recognition on the voice based on the comparison.

The processor may be further configured to perform the voice recognition on the voice based on the volume of the voice being greater than the standard voice volume.

The electronic apparatus may further include a communication interface, and the processor may be further configured to identify, based on another electronic apparatus connected through the communication interface indicating detection of the voice, whether to perform the voice recognition based on a predetermined priority order.

The processor may be further configured to set the predetermined priority order based on at least one from among a placement location of the electronic apparatus and the another electronic apparatus, a recognition result on the voice, and a user manipulation.

The processor may be further configured to: activate, based on the voice being input through the microphone while in a standby mode, the communication interface; convert, based on identifying that the voice recognition on the voice is to be performed, a mode of the electronic apparatus into a normal mode in which an entire configuration of the electronic apparatus is activated; and inactivate, based on identifying that the voice recognition on the voice is not to be performed, the communication interface.

The electronic apparatus may further include a sensor configured to sense a size of the space in which the electronic apparatus is located.

The electronic apparatus may further include a display, and the processor may be further configured to, based on identifying that the voice recognition on the voice is to be performed, control the display to display a UI screen requesting a confirmation on whether to perform the voice recognition.

The processor may be further configured to, based on the confirmation not being received within a predetermined time after displaying the UI screen, not perform the voice recognition on the voice, and control the communication interface to transmit information to the another electronic apparatus indicating the confirmation has not been received.

The electronic apparatus may further include: a sensor; and a communication interface, and the processor may be further configured to, based on another electronic apparatus connected through the communication interface indicating detection of the voice, identify an utterance direction of a user by using the sensor, and identify whether to perform the voice recognition based on the utterance direction.

The electronic apparatus may further include a communication interface configured to receive size information from a sensor configured to sense a size of the space in which the electronic apparatus is located.

The processor may be further configured to, based on identifying the voice as a trigger voice, perform the voice recognition without comparing the voice input through the microphone with the standard voice volume.

In accordance with an aspect of the disclosure, there is provided a method for controlling an electronic apparatus, the method including: receiving a voice input through a microphone of the electronic apparatus; comparing a volume of the voice and a standard voice volume corresponding to a space in which the electronic apparatus is located; and identifying whether to perform a voice recognition on the voice based on the comparing.

The method may further include, based on the volume of the voice being greater than the standard voice volume, recognizing the voice.

The identifying may include, based on another electronic apparatus indicating detection of the voice, whether to perform the voice recognition based on a predetermined priority order.

The method may further include setting the predetermined priority order based on at least one from among a placement location of the electronic apparatus and the another electronic apparatus, a recognition result on the voice, and a user manipulation.

The method may further include sensing a size of the space in which the electronic apparatus is located.

The method may further include: identifying, based on another electronic apparatus indicating detection of the voice; and identifying an utterance direction of a user, and the identifying whether to perform the voice recognition may be based on the utterance direction.

The method may further include receiving size information from a sensor configured to sense a size of the space in which the electronic apparatus is located.

The identifying may include performing the voice recognition based on identifying the voice as a trigger voice.

In accordance with an aspect of the disclosure, there is provided a non-transitory computer readable recording medium having embodied thereon a program, which when executed by a processor of an electronic apparatus, causes the electronic apparatus to execute a method including: receiving a voice input through a microphone of the electronic apparatus; comparing a volume of the voice and a standard voice volume corresponding to a space in which the electronic apparatus is located; and identifying whether to perform a voice recognition on the voice based on the comparing.

In accordance with an aspect of the disclosure, there is provided an electronic apparatus including: a memory; an interface; and a processor configured to identify whether to perform a voice recognition on a voice signal received through the interface based on a standard voice level and the voice signal.

The processor may be further configured to perform the voice recognition on the voice signal based on a level of the voice signal exceeding the standard voice level.

The processor may be further configured to perform the voice recognition on the voice signal based on a level of the voice signal exceeding the standard voice level and corresponding to a trigger command.

The processor may be further configured to identify a direction of a user based on the voice signal, and identify whether to perform the voice recognition on the voice signal based on the direction.

The processor may be further configured to control the interface to notify another electronic apparatus that the voice signal has been received, receive a notification from the other electronic apparatus indicating whether the other electronic apparatus has received the voice signal, and identify whether to perform the voice recognition on the voice signal based on the notification received from the other electronic apparatus.

The electronic apparatus may further include a display, and the processor may be further configured to identify whether to perform the voice recognition by controlling a confirmation screen to be displayed on the display based on the voice signal being received, and a confirmation voice signal received through the interface.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
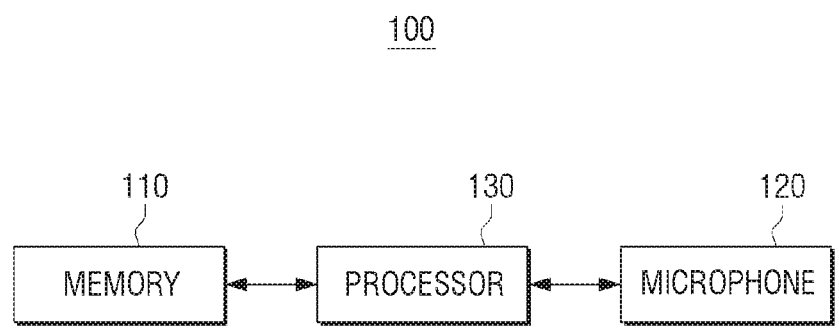
FIG. 1 is a block diagram illustrating a brief configuration of an electronic apparatus according to an embodiment.

Hereinafter, embodiments will be described in detail with reference to the drawings. In the following description, known configurations may be omitted. In addition, the following embodiments may be modified into various other forms, and the scope of the technical spirit of the present disclosure is not limited to the following examples. Rather, these embodiments are provided so that the present disclosure will be more thorough and complete, and will fully convey the scope of the technical spirit of the present disclosure to those skilled in the art.

Terms used in the present disclosure are selected in consideration of the configuration and functions of the present disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the present disclosure.

The embodiments may vary, and may be provided in different embodiments. Various embodiments will be described with reference to accompanying drawings. However, this is not intended to limit the scope to an embodiment, and therefore, it should be understood that all the modifications, equivalents or substitutes included under the inventive concept and technical scope are encompassed. In describing the embodiments, well-known functions or constructions may not be described in detail.

As used herein, the terms "1st" or "first" and "2nd" or "second" may use corresponding components regardless of importance or order and are used to distinguish one component from another without limiting the components.

As used herein, expressions such as "at least one from among," when preceding a list of elements, modify the entire list of elements and do not modify the individual elements of the list. For example, the expression, "at least one from among a, b, and c," should be understood as including only a, only b, only c, both a and b, both a and c, both b and c, or all of a, b, and c.

Singular forms are intended to include plural forms unless the context clearly indicates otherwise. In the embodiments, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In an embodiment, 'a module' or 'a unit' performs at least one function or operation, and may be realized as hardware, software, or combination thereof. In addition, a plurality of 'modules' or 'units' may be integrated into at least one module and may be realized as at least one processor in an integrated manner. Further, some 'modules' or 'units' may be realized in specific hardware.

Hereinafter certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

Below, embodiments will be described in detail with reference to the attached drawings.

FIG. 1 is a block diagram illustrating a brief configuration of an electronic apparatus according to an embodiment.

Referring to FIG. 1, the electronic apparatus 100 includes a memory 110, a microphone 120, and a processor 130.

The electronic apparatus 100 may include a display apparatus such as a personal computer (PC), a TV, and a mobile apparatus. If the electronic apparatus 100 does not include a display, the electronic apparatus 100 may include a set top box.

The memory 110 may be implemented as a storing medium in the electronic apparatus 100 and an external storing medium, for example, to a removable disk including a universal serial bus (USB) memory, a web server via network, and the like. Specifically, the memory 110 may include a hard disk, a solid-state drive (SSD), a memory card, a read-only memory (ROM), USB memory and the like.

The memory 110 may store the information on a standard voice volume corresponding to the structure of the space in which the electronic apparatus 100 is located. The structure of the space may include the size and shape of the space in which the electronic apparatus 100 is located.

The standard voice volume may be input by a user or an installation engineer, etc., when installing the electronic apparatus 100. The standard voice volume may be determined based on the structure of the space sensed by a sensor.

The memory 110 may store the information on the structure of the space sensed by the sensor. Specifically, the memory may store the information on the size and shape of the space in which the sensed electronic apparatus 100 is located, and the like. The size of the space may mean the distance between the electronic apparatus 100 and a boundary of the space.

In addition, the memory 110 may store the information on the voice of another electronic apparatus received through a communication interface 140 or the information on the voice input through a microphone 120.

The microphone 120 may receive a voice. Specifically, the microphone 120 may receive a voice from an outside and convert the voice into a voice signal which can be processed in the electronic apparatus 100.

The microphone 120 may be included in the electronic apparatus 100. Also, an additional microphone apparatus may be connected to the electronic apparatus 100. Specifically, the additional microphone may be connected to the electronic apparatus 100 in a wired manner or wirelessly. Specifically, if connected wirelessly, the microphone 120 may be a microphone which is included in a mobile apparatus connected to an electronic apparatus 100 such as a remote controller or a smartphone, etc.

The processor 130 may determine whether to recognize the voice input through the microphone 120. Voice recognition may indicate technology that converts an acoustic signal of the voice input through the microphone 120 into a word or a sentence.

Specifically, the processor 130 may compare the standard voice volume stored in the memory 110 and the volume of the voice input through the microphone 120, and determine whether to recognize the voice input through the microphone 120. For example, if the volume of the voice input through the microphone 120 exceeds the standard voice volume stored in the memory, the processor may identify to recognize the voice input through the microphone.

If the microphone 120 is a microphone included in the mobile apparatus connected to the electronic apparatus 100 such as a remote controller or a smartphone, etc., if it is determined that a user has an intension to input through the microphone included in the mobile apparatus connected to the electronic apparatus 100, the processor 130 may determine to perform a voice recognition on the input voice.

For example, if a user inputs a voice while pushing a microphone button of a remote controller or a smartphone connected to the electronic apparatus 100, the processor 130 determines that a user wishes to manipulate the electronic apparatus 100, and determines to recognize the input voice prior to another electronic apparatus. That is, if a user pushes a microphone button of a smartphone or a remote controller connected to the electronic apparatus 100 and input a voice, even in a case in which a user deviates from the space in which the electronic apparatus 100 that a user wishes to control is located, it may be determined to perform a voice recognition in the electronic apparatus 100. A user may assign a priority to each electronic apparatus 100, and the priority may be changed by the setting of a user.

Also, if it is determined that the voice recognition on the input voice is to be performed, the processor 130 may perform a voice recognition on the input voice. In addition, the processor 130 may perform an event corresponding to the result of the voice recognition. Specifically, as a result of the voice recognition, if the voice input through the microphone 120 is a control command, the processor 130 may perform an operation corresponding to the control command.

The processor 130 may perform an event corresponding to the result of the voice recognition when a predetermined trigger voice is input through the microphone 120. Specifically, when it is determined the input voice is a trigger voice as a result of the voice recognition regarding the input voice, the processor 130 may perform an event corresponding to the voice recognition result such as activating the electronic apparatus 100 and the like.

If it is determined to perform a voice recognition on the input trigger voice, the processor 130 may perform a voice recognition without comparing the following voice input through the microphone 120 with the standard voice volume.

Figure 2:
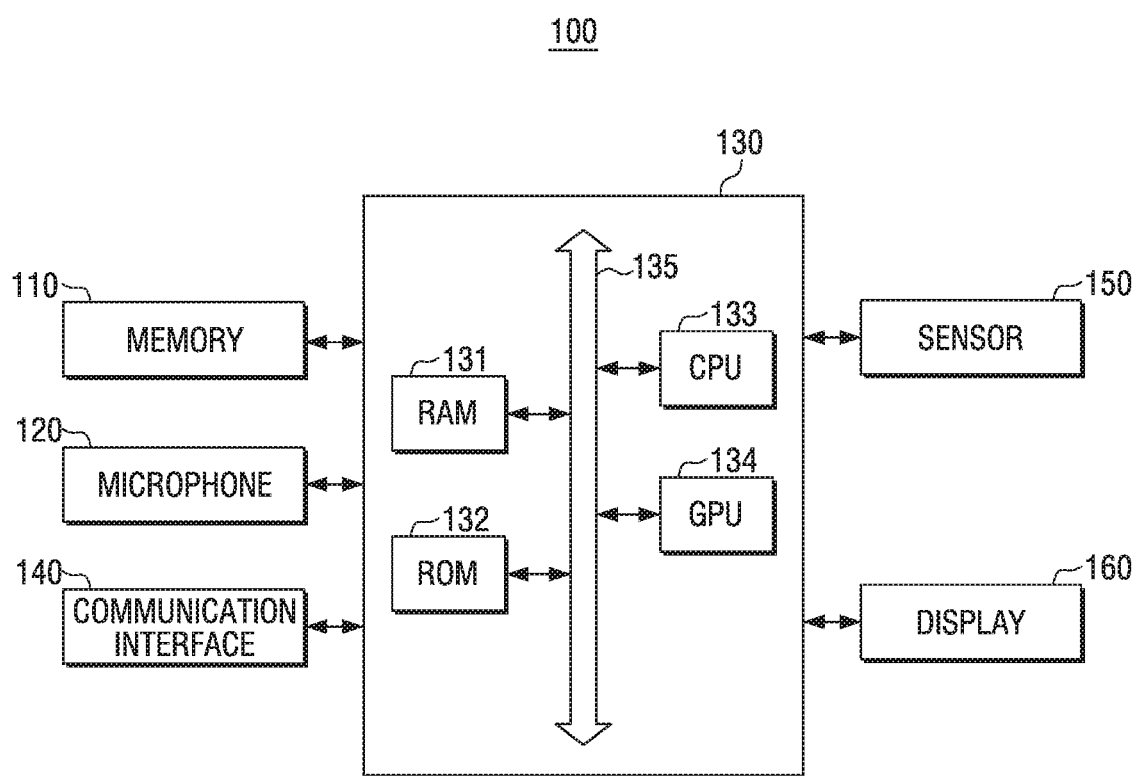
FIG. 2 is a block diagram illustrating a detailed configuration of an electronic apparatus of FIG. 1.

FIG. 2 is a block diagram illustrating a specific configuration of the electronic apparatus of FIG. 1.

Referring to FIG. 2, the electronic apparatus 100 may include the memory 110, the microphone 120, the processor 130, the communication interface 140, the sensor 150 and the display 160.

The memory 110 and the microphone 120 are the same configuration with the microphone 120 illustrated in FIG. 1, and thus overlapping description will be omitted.

The processor 130 may include a random access memory (RAM) 131, a ROM 132, a central processing unit (CPU) 133, a graphics processing unit (GPU) 134, a bus 135 and the like. The RAM 131, the ROM 132, the CPU 133, and the GPU 134 may be connected to one another through the bus 135.

The CPU 133 accesses the memory 110 and performs booting using an operating system (O/S) stored in the memory 110. The CPU 133 performs various operations by using various types of programs, contents, and data, etc. stored in the memory 110.

The ROM 132 stores a set of commands for system booting. When a turn-on command is input and power is provided, the CPU 133 may copy the O/S stored in the memory 110 to the RAM 131 according to the command stored in the ROM 132 and execute the O/S for booting the system. When the booting is completed, the CPU 133 may copy various programs stored in the memory 110 to the RAM 131 and execute the programs copied in the RAM 131 to perform various operations.

The GPU 134 may display a UI on the display 160 when the booting of the electronic apparatus 100 is completed. Specifically, the GPU 134 may generate a screen including various objects such as an icon, an image, a text, and the like using a computing unit and a renderer. The computing unit may compute attribute values such as coordinates, shape, size, and color of each object to be displayed according to the layout of the screen. The renderer may generate screens with various layouts including objects based on the attribute value calculated in the operation unit. The screens (or user interface window) generated in the renderer may be provided to the display, and displayed on each of a main display area and a sub display area. It has been described that the image processing operation is performed by the GPU 134, but in an implementation, the operation may be performed by the CPU 133 or the GPU 134.

The communication interface 140 may be a transceiver (transmitter and receiver) that communicates with various types of external apparatuses according to various types of communication methods. Specifically, the communication interface 140 may communicate with an external apparatus such as a remote controller, an external server, an external speaker apparatus, another electronic apparatus and the like. The other electronic apparatus may be located in the space divided from the space in which the electronic apparatus 100 is located. For example, if the electronic apparatus 100 is located in a living room, the other electronic apparatus may be located in a bedroom. The number of the other apparatus may be more than one.

In a standby mode, the communication interface 140 is in an inactive state and the microphone 120 and the processor 130 are activated. When the voice is input through the microphone 120, the communication interface 140 may be activated by a control of the processor 130. Thereafter, if it is determined that the electronic apparatus 100 does not perform a voice recognition on the input voice, the communication interface 140 may be placed in an inactive state by a control of the processor 130. The operation of various elements of the electronic apparatus 100 will be described in detail with reference to FIGS. 4A, 4B and 4C, below.

Specifically, the communication interface 140 may receive the information on an image signal, an audio signal, and an input voice from an external apparatus through a wired method such as an antenna, cable, or a port, or may receive the information on an image signal, an audio signal, and an input voice from an external apparatus through the wireless method such as Wi-Fi and Bluetooth. The information on the received input voice may be the information on whether the other electronic apparatus performs a voice recognition on the voice input to the other electronic apparatus. Specifically, the information on the received voice may include at least one of standard voice volume information based on the structure of the space in which the other electronic apparatus is located, information on the volume of the voice input by the other electronic apparatus, information on the utterance direction of a user, and information on whether to recognize a voice determined based on these information.

Specifically, the other electronic apparatus may receive the same voice with the voice input to the electronic apparatus 100 (the feature of the voice input to each electronic apparatus, such as a volume of a voice, may be different). The other electronic apparatus may determine whether to recognize the voice input from the other electronic apparatus based on the structure of the space in which the other electronic apparatus is located, and transmit the information thereon to the electronic apparatus 100.

In addition, the communication interface 140 may receive the information on the voice input to the other electronic from the other electronic apparatus, and transmit the information on the voice input through the microphone 120 to the other electronic apparatus. The information transmitted to the other electronic apparatus may include at least one of standard voice volume information based on the structure of the space in which the electronic apparatus 100 is located, information on the volume of the voice input by the electronic apparatus 100, information on the utterance direction of a user, and information on whether to recognize a voice determined based on these information. For this, the electronic apparatus 100 and the other electronic apparatus may be connected to the same access point (AP). The electronic apparatus 100 and the other electronic apparatus may be connected to a server and in this case, the communication interface 140 is connected to the server and information may be shared with the other electronic apparatus through the connected server without going through an additional AP.

The sensor 150 may sense the structure of a space in which the electronic apparatus 100 is located. Specifically, the sensor 150 may sense the size and shape of the space in which the electronic apparatus 100 is located. The size of the space may mean the distance between the electronic apparatus 100 and a boundary of the space.

The sensor 150 may include at least one of an ultrasonic sensor, an infrared sensor, a color sensor, a camera and a motion sensor. Specifically, if the sensor 150 is the ultrasonic sensor or the infrared sensor, the sensor 150 may sense an ultrasonic waves or an infrared signal emitted from the electronic apparatus 100, reflected from the boundary of the space and returned back. For example, the ultrasonic waves or infrared signal may be emitted in all directions. The processor 130 may measure the time between the emission of the ultrasonic wave or the infrared signal and a detection of the reflected signal, and determine the structure of the space in which the electronic apparatus 100 is located.

The sensor 150 may be an external sensor not included in the electronic apparatus 100, and the electronic apparatus 100 may receive the value sensed from an external sensor, or the information on the standard voice volume calculated based on the value sensed from an external sensor, through the communication interface 140.

In addition, the sensor 150 may be used to determine whether a user exists in front of the electronic apparatus 100 or an utterance direction of a user. Specifically, movement of items in a room other than the user are minimal, and thus if the sensor 150 is a motion sensor, the processor 130 may sense the movement and identify whether the user is located in front of the electronic apparatus 100. Alternatively, if the sensor 150 is a camera, the processor 130 may analyze the video corresponding to the space and identify whether the user uttered a voice toward the electronic apparatus 100. Alternatively, if the sensor 150 is an ultrasonic sensor, an emitted ultrasonic sensor may be interfered by a wave of a voice uttered by a user, and thus the processor 130 may identify the user's utterance direction according to the change between the amplitude of the emitted ultrasonic wave and the amplitude of the ultrasonic wave sensed by the sensor 150 after the emitted ultrasonic wave is reflected.

The processor 130 may identify the structure of the space in which the electronic apparatus 100 is located based on the signal sensed in the sensor 150. If the electronic apparatus 100 is initially installed, the processor 130 may identify the structure of the space in which the electronic apparatus 100 is located and store the structure in the memory 110. The processor 130 may figure out the structure of the space in which the electronic apparatus 100 is located whenever a voice is input through the microphone 120, or at a predetermined period.

The processor 130 may determine the standard voice volume based on the structure of the space sensed by the sensor 150. The standard voice volume may be determined as a specific decibel (dB) level according to the sensed size of the space. The standard voice volume may be the value previously input by an installation engineer or a user, such as during installation of the electronic apparatus 100.

The processor 130 may determine whether to perform a voice recognition based on the structure of the space sensed by the sensor 150. Specifically, if it is determined that the voice input through the microphone 120 is uttered in the space in which the electronic apparatus 100 is located, the processor 130 may perform a voice recognition on the input voice. For example, if the volume of the voice input through the microphone 120 is higher than the standard voice volume corresponding to the size of the space, the processor 130 may determine that the voice has been uttered in the space in which the electronic apparatus 100 is located, and recognize the input voice.

If the electronic apparatus 100 stores the information on the structure of the space in which the electronic apparatus 100 is located in the memory 110, the processor 130 may determine whether the voice recognition is to be performed on the voice input through the microphone 120 using the stored information.

The processor 130 may perform an audio processing on the voice input through the microphone 120 based on the structure of the space sensed by the sensor 150. Specifically, the processor 130 may perform audio processing on the input voice considering an echo in the space and the voice reflected from the boundary of the space in addition to the uttered voice, based on the size and shape of the space in which the electronic apparatus 100 is located.

It has been described that whether to recognize a voice is determined based on the intensity of sound which is a volume of a voice, but in the implementation, embodiments are not limited to the intensity of sound and the standard to determine whether to recognize a voice may be set by further considering various features of the voice. Specifically, the processor 130 may determine whether to perform a voice recognition by using the number of vibrations and waveform of the voice in addition to the amplitude of a voice that indicates an intensity of a voice.

The processor 130 may determine whether to perform a voice recognition on the voice input by the microphone 120 by further considering information received from another electronic apparatus by the communication interface 140. Specifically, it may be determined that any one of the electronic apparatus 100 and another electronic apparatus is to perform the voice recognition. If it is determined that two or more than two electronic apparatuses are to perform the voice recognition, an additional operation of determining one electronic apparatus may be required. For example, it may be possible that both of the electronic apparatus 100 and the other electronic apparatus perform a voice recognition because the volume of the voice input through the microphone 120 is higher than the standard voice volume of the electronic apparatus 100, and the voice input through the other electronic apparatus is higher than the standard voice volume of the other electronic apparatus, with regard to the same voice.

If both of the electronic apparatus 100 and the other electronic apparatus perform a voice recognition, the processor 130 may determine whether to process the voice recognition result based on the predetermined priority order. Specifically, if both of the electronic apparatus 100 and the other electronic apparatus perform a voice recognition and the electronic apparatus 100 has a priority order, the processor 130 may perform a corresponding event according to the voice recognition result. The other electronic apparatus may not perform a voice recognition on the input voice, or may perform a voice recognition but does not perform an operation according to the recognition result.

If both of the electronic apparatus 100 and the other electronic apparatus perform a voice recognition and the other electronic apparatus has a priority order, the processor 130 may not perform a voice recognition itself or perform a voice recognition but does not perform an operation according to the recognition result.

The predetermined priority order may be at least one of a disposition location of the electronic apparatus 100 and the other electronic apparatus, a recognition result of the input voice, and a user manipulation. Specifically, in a case of a general voice control command, the electronic apparatus in a living room has a priority order rather than the electronic apparatus in a room. In a case of a voice command related to a music display, the electronic apparatus of which speaker has the greater performance may have a priority order. In a case of a voice command related to a video display, the electronic apparatus which has bigger screen or greater resolution may have a priority order. The electronic apparatus set to have a priority order in advance may process the voice recognition result.

If both of the electronic apparatus 100 and the other electronic apparatus can perform a voice recognition, the processor 130 may determine whether to perform process on the voice recognition result based on the utterance direction of a user. Specifically, if both of the electronic apparatus 100 and the other electronic apparatus can perform a voice recognition, the processor 130 may identify the utterance direction of a user by the sensor 150. The sensor 150 may be at least one of a camera, an ultrasonic sensor, an infrared sensor, a color sensor, and a motion sensor.

In addition, the processor 130 may perform a voice recognition on the voice input through the microphone 120 if it is determined that a user's utterance direction faces the electronic apparatus 100.

In a state in which only the communication interface 140 is activated according to a voice input through the microphone 120 while in a standby mode, if it is determined to perform a voice recognition on the input voice, the processor 130 may convert the mode from the standby mode into a general mode which activates an entire configuration of the electronic apparatus 100. In a state in which only the communication interface 140 is activated according to a voice input through the microphone 120 in a standby mode, if it is determined not to perform a voice recognition on the input voice, the processor 130 may inactivate the activated communication interface 140 and access a standby mode.

The display 160 may indicate a request to confirm whether a voice recognition is to be performed based on the voice input through the microphone 120. Specifically, if it is determined to perform a voice recognition on the voice input through the microphone 120, the display 160 may display a UI screen for receiving a confirmation on whether to perform a voice recognition from a user. Receiving the confirmation on whether to perform the voice recognition may be the same meaning with the reception of a confirmation on whether the electronic apparatus to be controlled by a voice command is the electronic apparatus 100 that displays the UI screen.

The display 160 may be implemented as various types of displays, such as a liquid crystal display (LCD), an organic light emitting diode (OLED) display, and a plasma display panel (PDP). The display may include a driving circuit, a backlight unit, and the like which may be implemented in forms using, for example, an amorphous silicon (a-Si) thin-film-transistor (TFT), a low temperature poly silicon (LTPS) TFT, an organic TFT (OTFT), and the like. In addition, the display may also be implemented as a flexible display.

If an answer is not received from a user within a predetermine time after displaying a UI screen requesting a confirmation on whether to perform a voice recognition, the processor 130 may not perform a voice recognition on the input voice or perform the voice recognition but not perform an operation corresponding to the recognition result. Specifically, if an answer is not received from a user, the processor 130 may determine that the electronic apparatus that a user wishes to control is not the electronic apparatus that displays the UI screen regardless of the priority order, etc.

Accordingly, the processor 130 may control the communication interface 140 to transmit the information on the recognition result to another electronic apparatus. Accordingly, even if the electronic apparatus that a user wishes to control with a voice command and the electronic apparatus that has a priority order are not the same, the electronic apparatus that a user wishes to control with the voice command may be determined.

According to embodiments, the electronic apparatus 100 may not include a display. For example, if the electronic apparatus 100 only performs signal processing, such as a set top box and the like, the display 160 may be omitted, and the processor 130 may control information to be displayed on the UI screen to be transmitted to an external display apparatus via the communication interface 140 so that the external display apparatus displays the UI screen.

As described above, according to various embodiments, the electronic apparatus that a user wishes to control with a voice command may be determined without an additional setting in the environment in which a plurality of electronic apparatus is installed. Accordingly, the electronic apparatus to be controlled by a voice command is determined automatically, and thus a user's convenience may be greatly improved.

Figure 3:
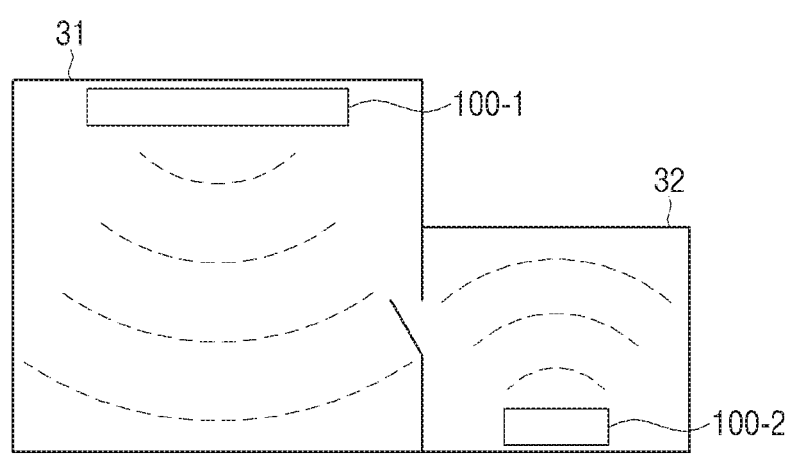
FIG. 3 is a view illustrating an embodiment in which an electronic apparatus identifies a structure of a space.

FIG. 3 is a view illustrating an embodiment in which an electronic apparatus identifies a structure of a space.

Referring to FIG. 3, the first electronic apparatus 100-1 is located in the first space 31, and the second electronic apparatus 100-2 is located in the second space 32 which is distinct from the first space 31. The first electronic apparatus 100-1 and the second electronic apparatus 100-2 may each be a display apparatus such as a TV, or a set top box that does not include a display. Hereinafter it will be assumed that the first electronic apparatus 100-1 and the second electronic apparatus 100-2 are a TV for a convenience of explanation.

First, the first electronic apparatus 100-1 and the second electronic apparatus 100-2 may sense the structure of the first space 31 and the second space 32 in which the first and the second electronic apparatus are located respectively. Specifically, the sensor 150 included in each of the first electronic apparatus 100-1 and the second electronic apparatus 100-2 may be used. The sensor 150 may be an ultrasonic sensor, an infrared sensor, a camera, a color sensor, and a motion sensor, etc.

Specifically, the first electronic apparatus 100-1 and the second electronic apparatus 100-2 may measure the distance from the first electronic apparatus 100-1 to an opposing wall of the first space 31 and the distance from the second electronic apparatus 100-2 to an opposing wall of the second space 32 by using the sensor 150, and identify shapes of the first space 31 and the second space 32.

In addition, the first electronic apparatus 100-1 and the second electronic apparatus 100-2 may store the sensed result in the included memory respectively, and when a voice is input, may use the result when determining whether to recognize the voice.

Figure 4A:
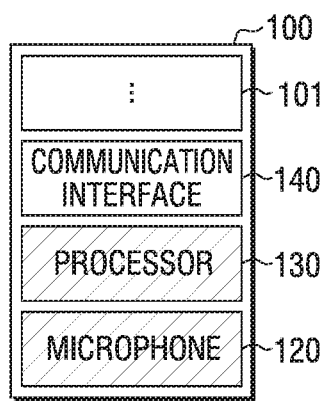
FIGS. 4A, 4B, and 4C are views illustrating a driving of a case in which a voice is input to an electronic apparatus.
Figure 4B:
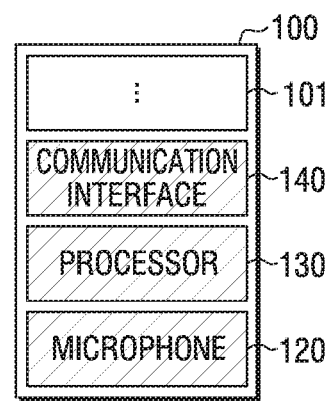
Figure 4C:
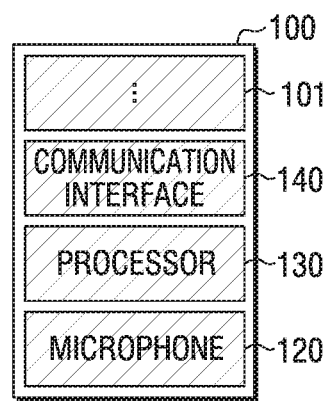

FIGS. 4A, 4B and 4C are views illustrating a driving when a voice is input to an electronic apparatus in a standby mode.

FIG. 4A is a view illustrating an operation when the electronic apparatus 100 is in a standby mode, FIG. 4B is a view illustrating an operation when a voice is input when the electronic apparatus 100 is in a standby mode, and FIG. 4C is a view illustrating an operation when the electronic apparatus 100 is in a general mode.

Specifically, referring to FIGS. 4A, 4B and 4C, the electronic apparatus 100 may include the microphone 120, the processor 130, the communication interface 140, and the remaining configuration 101. The remaining configuration 101 is used for a convenience of description, and may mean the configuration except for the microphone 120, the processor 130, and the communication interface 140 from all configurations that configures the electronic apparatus 100.

Referring to FIG. 4A, when the electronic apparatus 100 is in a standby mode, only the microphone 120 and the processor 130 are activated, and the communication interface 140 and the remaining configuration 101 may be in an inactive state.

As illustrated in FIG. 4B, if a voice is input through the microphone 120 when the electronic apparatus 100 is in the standby mode, the processor 130 may activate the communication interface 140. Once activated, the communication interface 140 may be used for receiving and transmitting information with another electronic apparatus. Even if a voice is input in the standby mode, the remaining configuration 101 may still be in an inactive state.

If the processor 130 determines to perform a voice recognition on the voice input through the microphone 120 and determines to perform process according to the voice recognition result, as illustrated in FIG. 4C, the remaining configuration 101 of the electronic apparatus 100 may be activated so that a mode may be converted into a normal mode in which all configurations are activated.

The sensor 150 in the remaining configuration 101 may be activated for determining whether to perform a voice recognition on the voice input through the microphone 120. In addition, if the processor 130 determines to perform the voice recognition on the voice input through the microphone 120, the display in the remaining configuration 101 may be activated to display the UI screen for receiving a confirmation on whether to perform the voice recognition from a user before accessing a general mode.

If the processor 130 determines not to perform a voice recognition on the voice input through the microphone 120, the communication interface 140 is inactivated and the electronic apparatus 100 may access the standby mode again as illustrated in FIG. 4A.

As illustrated above, by determining whether to perform a voice recognition and whether to process the voice recognition result, only the electronic apparatus that a user wishes to control with a voice command reacts to the voice command, and thus a user convenience may be greatly improved.

In addition, according to the determination on whether to perform a voice recognition and whether to process the voice recognition result, the configuration is activated in order, power consumption may be reduced.

Figure 5:
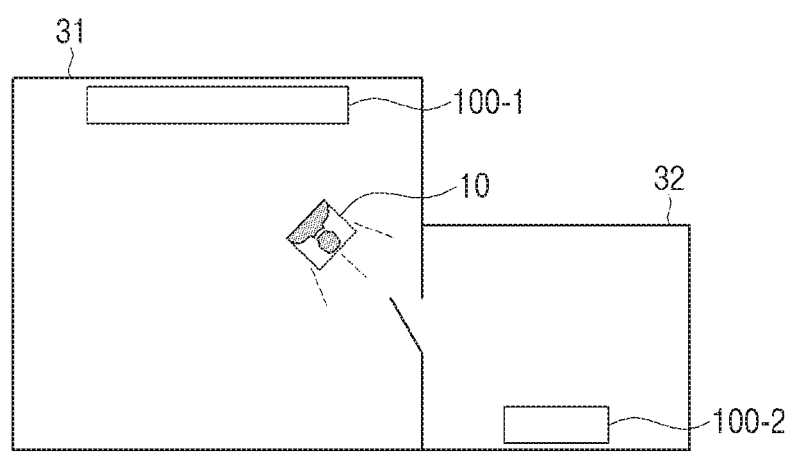
FIG. 5 is a view illustrating identification of an electronic apparatus to be controlled by voice recognition.

FIG. 5 is a view illustrating identification of an electronic apparatus to be controlled by a voice recognition.

Referring to FIG. 5, the first electronic apparatus 100-1 is located in the first space 31, and the second electronic apparatus 100-2 is located in the second space 32 divided from the first space 31. The user 10 is located in the first space 31 in which the first electronic apparatus 100-1 is located, but may control the second electronic apparatus 100-2 located in the second space 32 with a voice.

The first electronic apparatus 100-1 and the second electronic apparatus 100-2 may each determine an utterance direction of the user respectively and determine whether to perform a control according to the voice of the user 10 based on the utterance direction.

Specifically, each of the first electronic apparatus 100-1 and the second electronic apparatus 100-2 may determine the utterance direction of the user by using an equipped sensor 150. For example, if the first electronic apparatus 100-1 and the second electronic apparatus 100-2 include a camera as a sensor 150, when the user 10 utters a voice, a front image may be captured. Each of the first electronic apparatus 100-1 and the second electronic apparatus 100-2 may analyze the captured front image and determine the direction that the user 10 is looking. As such, based on the determination on the direction that the user 10 is looking, the first electronic apparatus 100-1 and the second electronic apparatus 100-2 may determine the direction to which the user 10 uttered.

If each of the first electronic apparatus 100-1 and the second electronic apparatus 100-2 includes an ultrasonic sensor as a sensor 150, the ultrasonic wave having the size of predetermined amplitude in a predetermined period. An interference may occur between the voice of the user 10 and the emitted ultrasonic wave. Accordingly, between the first electronic apparatus 100-1 and the second electronic apparatus 100-2, the electronic apparatus that senses the ultrasonic wave having the amplitude different from the size of the emitted ultrasonic wave may determine that the user 10 is looking the electronic apparatus and perform a voice recognition.

As described above, by determining whether to perform the voice recognition based on the utterance direction of the user in addition to the structure of the space in which the electronic apparatus is located, the electronic apparatus that the user wishes to control with a voice is able to be determined more accurately.

Figure 6:
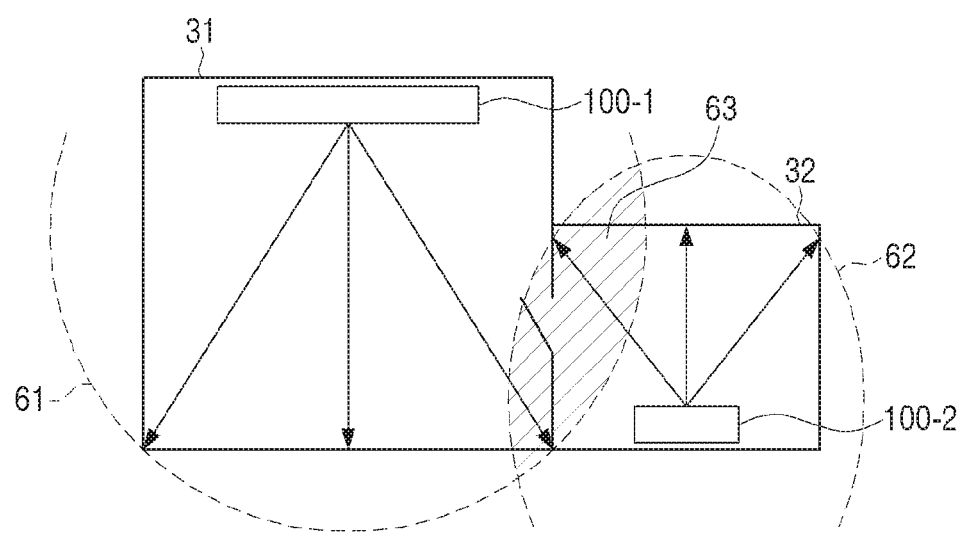
FIGS. 6 to 8 are views illustrating an electronic apparatus to be controlled by voice recognition according to various embodiments.
Figure 7:
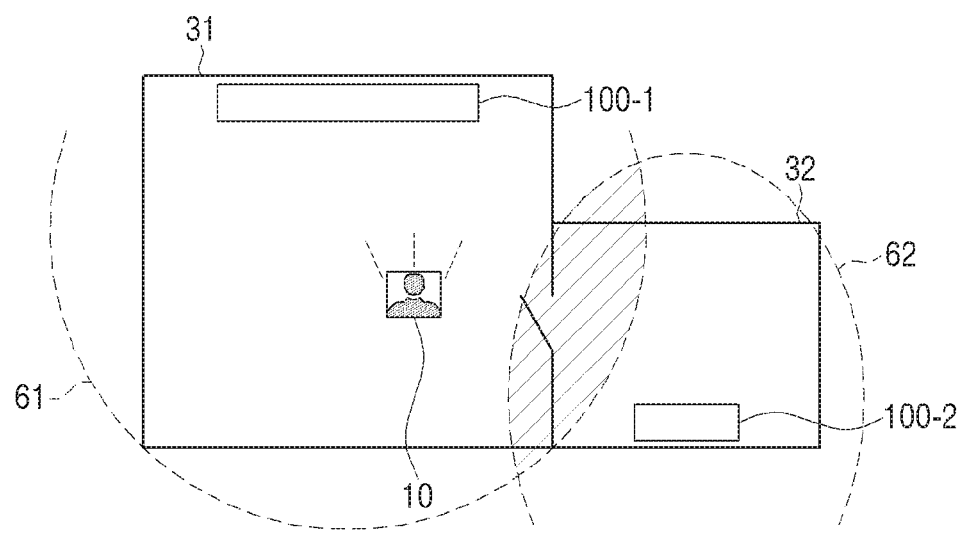
Figure 8:
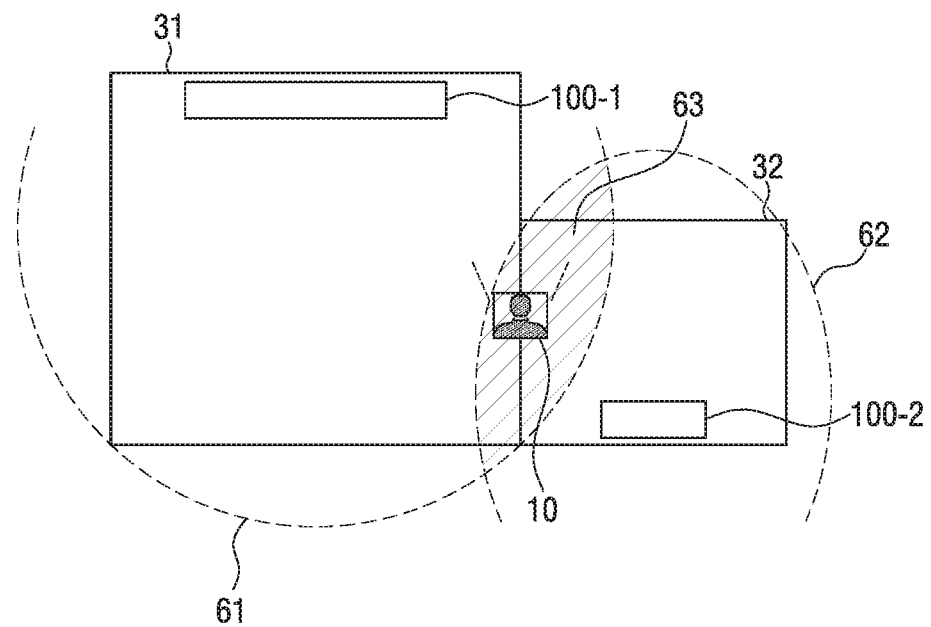

FIGS. 6 to 8 are views illustrating identification of electronic apparatus to be controlled by voice recognition according to various embodiments.

FIG. 6 illustrates identification of a standard voice volume according to the structure of a sensed space according to an embodiment.

Referring to FIG. 6, the first electronic apparatus 100-1 may sense the structure of the first space 31 in which the electronic apparatus 100-1 is located, and determine the standard voice volume based on the structure of the first space 31. Specifically, the first electronic apparatus 100-1 may determine the standard voice volume based on the size of the first space 31. The standard voice volume may be a standard to determine that a voice is generated in the first space 31. In addition, the first electronic apparatus 100-1 may set the area 61 in which a voice recognition may be performed based on the determined standard voice volume.

In FIG. 6, the standard voice volume may be determined based on the point farthest away from the first electronic apparatus 100-1 in the first space, and the first space 31 and the space beyond the first space 31 may be included in the area 61 in which the first electronic apparatus 100-1 may perform a voice recognition. However, embodiments are not limited thereto, and the standard voice volume may be determined based on various standards, and the size of the space in which the voice recognition may be performed may be adjusted.

In addition, using a similar operation with the above described operation of the first electronic apparatus 100-1, the second electronic apparatus 100-2 may sense the structure of the second space 32 in which the second electronic apparatus 100-2 is located, and determine the standard voice volume based on the structure of the sensed second space 32. Specifically, the second electronic apparatus 100-2 may sense the structure of the second space 32 and determine the standard voice volume based on the size of the second space 32. The standard voice volume may be the voice volume which is a standard to determine that a voice is generated in the second space 32. In addition, the second electronic apparatus 100-2 may set the area 62 in which a voice recognition may be performed based on the determined standard voice volume.

In FIG. 6, the standard voice volume may be determined based on the point farthest away from the second electronic apparatus 100-2 in the second space 32, and the second space 32 and the space beyond the second space 32 may be included in the area 62 in which the second electronic apparatus 100-2 may perform a voice recognition. However, embodiments are not limited thereto, and the standard voice volume is determined based on various standards, and the size of the space in which the voice recognition may be performed may be adjusted.

The first electronic apparatus 100-1 and the second electronic apparatus 100-2 may share the information on the area in which the voice recognition may be performed. Specifically, the first electronic apparatus 100-1 and the second electronic apparatus 100-2 may share the information on the standard voice volume.

An overlapping area 63 of the area 61 in which the first electronic apparatus 100-1 may perform a voice recognition and the area 62 in which the second electronic apparatus 100-2 may perform a voice recognition may exist. If a user uttered a voice in the overlapping area 63, both of the first electronic apparatus 100-1 and the second electronic apparatus 100-2 may perform a voice recognition. This will be described in detail referring to FIG. 8 in below.

FIG. 7 illustrates identification of an electronic apparatus to perform a voice recognition when the area 61 in which the first electronic apparatus 100-1 may perform a voice recognition and the area 62 in which the second electronic apparatus 100-2 may perform a voice recognition are set, according to an embodiment.

The area 61 in which the first electronic apparatus 100-1 may perform a voice recognition is determined based on the structure of the first space 31 in which the first electronic apparatus 100-1 is located, and the area 62 in which the second electronic apparatus 100-2 may perform a voice recognition is determined based on the structure of the second space 32 in which the second electronic apparatus 100-2 is located.

Referring to FIG. 7, the user 10 may utter in the area 61 in which the first electronic apparatus 100-1 may perform a voice recognition but beyond the area 62 in which the second electronic apparatus 100-2 may perform a voice recognition. Specifically, that the user 10 utters in the area 61 in which the first electronic apparatus 100-1 may perform a voice recognition means that the volume of the voice uttered by the user 10 is higher than the standard voice volume determined in the first electronic apparatus 100-1. The first electronic apparatus 100-1 may determine to perform the voice recognition on the input voice of the user 10.

That the user 10 uttered in the area beyond the area 62 in which the second electronic apparatus 100-2 may perform a voice recognition means that the volume of the voice uttered by the user 10 is lower than the standard voice volume determined in the second electronic apparatus 100-2. The second electronic apparatus 100-2 may determine not to perform a voice recognition on the input voice of the user 10 even if the voice of the user 10 is input.

The first electronic apparatus 100-1 and the second electronic apparatus 100-2 may share the result of the determination regarding whether to perform the voice recognition.

The first electronic apparatus 100-1 may determine to perform a voice recognition on the input voice of the user 10 and display a UI screen for receiving a confirmation on the determination result from the user. If the user confirms that the first electronic apparatus 100-1 is to be controlled by a voice, the first electronic apparatus 100-1 may recognize the voice uttered by the user 10 and perform an event corresponding to the recognition result.

If there is no user's response for a predetermined time after displaying the UI screen, the first electronic apparatus 100-1 may not perform a voice recognition on the voice of the user 10 and transmit the information that there was no response, to the second electronic apparatus 100-2, so that the second electronic apparatus 100-2 displays the UI for receiving the confirmation on whether to perform the voice recognition from the user.

Accordingly, even if the electronic apparatus determined to perform the voice recognition and the electronic apparatus that the user 10 wishes to control with a voice is not the same, the electronic apparatus to be controlled by a voice recognition may still be identified, and thus the user's convenience may be improved.

Referring to FIG. 8, the user 10 may utter in the overlapping area 63 of the area 61 corresponding to the first electronic apparatus 100-1 and the area 62 corresponding to the second electronic apparatus 100-2. Specifically, that the user 10 uttered in the overlapping area 63 means that the volume of the voice uttered by the user 10 is higher than the standard voice volume determined in the first electronic apparatus 100-1 and the standard voice volume determined in the second electronic apparatus 100-2.

As such, both of the first electronic apparatus 100-1 and the second electronic apparatus 100-2 may perform a voice recognition, and each of the first electronic apparatus 100-1 and the second electronic apparatus 100-2 may determine whether to perform a voice recognition or whether to perform a process according to the voice recognition result according to the predetermined priority order.

The predetermined priority order may be based on at least one of a disposition location of the first electronic apparatus 100-1 and the second electronic apparatus 100-2, a recognition result on an input voice, and a user's manipulation. Specifically, in a case of a general voice control command, the electronic apparatus in a living room may have a priority rather than the electronic apparatus in a room. In a case of a voice command related to a music display, the electronic apparatus of which speaker has a greater performance may have a priority order. In a case of a voice command related to a video display, the electronic apparatus which has a bigger screen or greater resolution may have a priority order. The electronic apparatus set to have a priority order in advance by a user may perform process on the voice recognition result.

If both of the first electronic apparatus 100-1 and the second electronic apparatus 100-2 can perform a voice recognition, the first electronic apparatus 100-1 and the second electronic apparatus 100-2 may determine whether to perform a voice recognition or whether to perform process on the voice recognition result based on the utterance direction of the user 10.

The description on determining the utterance direction of the user 10 is recited in the description of FIG. 5, and thus the overlapping description would be omitted.

FIGS. 3 and 5 through 8 illustrate two electronic apparatuses, but also when the number of the electronic apparatuses is more than two, the technology of an embodiment could be applied.

Figure 9:
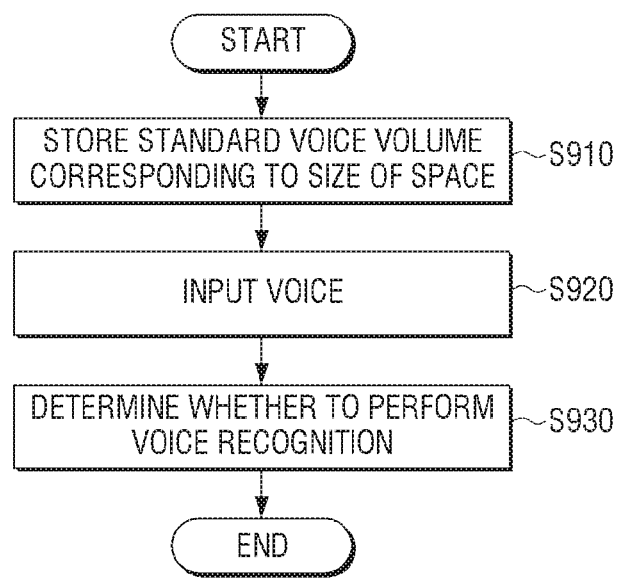
FIG. 9 is a block diagram illustrating a controlling method of an electronic apparatus according to an embodiment.

FIG. 9 is a block diagram illustrating a method for controlling an electronic apparatus according to an embodiment.

Referring to FIG. 9, first, the electronic apparatus may sense the structure of the space in S910. The structure of the sensed space may be the structure of the space in which the electronic apparatus is located. In addition, the electronic apparatus may store the information on the structure of the sensed space.

Next, the electronic apparatus may receive a voice in S920. Specifically, the electronic apparatus may receive the voice uttered by a user through an equipped microphone. If the electric apparatus receives a voice in a standby mode, the electronic apparatus may activate the communication interface to perform communication with another electronic apparatus.

Next, the electronic apparatus may determine whether to recognize a voice in S930. Specifically, the electronic apparatus may determine whether to perform a voice recognition on the voice input through a microphone based on the structure of the sensed space. Specifically, the electronic apparatus determines the standard voice volume based on the structure of the sensed space and if the volume of the voice input through the microphone is higher than the standard voice volume, may determine to perform a voice recognition on the input voice.

The electronic apparatus receives the information on the voice input from another electronic apparatus from the other electronic apparatus through the activated communication interface, and determine whether to perform a voice recognition further considering the information on the received voice. Specifically, if it is determined that both of the electronic apparatus and the other electronic apparatus may perform a voice recognition on the input voice, the electronic apparatus which will be controlled by a user with a voice may be determined based on the predetermined priority order or an utterance direction of the user.

If the volume of the voice input through the microphone is lower than the standard voice volume, the electronic apparatus may determine not to perform a voice recognition on the input voice. As such, if it is determined not to perform the voice recognition, the electronic apparatus may inactivate the activated communication interface and access a standby mode.

According to various embodiments, the electronic apparatus that a user wishes to control with a voice may be determined without an additional setting in the environment in which a plurality of electronic apparatuses are installed Like this, because the electronic apparatus to be controlled with the voice command is automatically determined, the user convenience is greatly improved.

Various embodiments described above may be implemented in a recording medium that may be read by a computer or a similar apparatus to the computer by using software, hardware, or a combination thereof. According to the hardware embodiment, embodiments that are described in the present disclosure may be implemented by using at least one selected from application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions. In some cases, embodiments that are described in the present disclosure may be embodied as a processor itself. In a software embodiment, various embodiments described in the present disclosure such as a procedure and a function may be implemented as separate software modules. The software modules may respectively perform one or more functions and operations described in the embodiments.

Instructions for controlling an electronic apparatus to perform methods according to various embodiments may be stored on a non-transitory readable medium. The non-transitory readable medium may be installed and used in various devices.

The non-transitory computer readable medium stores data semi-permanently and which is readable by an apparatus. For example, a non-transitory computer readable medium may be a compact disc (CD), a digital video disc (DVD), a hard disk, a Blu-ray disk, a USB memory, a memory card, ROM, or the like.

Although various embodiments of the present disclosure have been illustrated and described hereinabove, the present disclosure is not limited to the above-mentioned embodiments, but may be variously modified by those skilled in the art to which the present disclosure pertains without departing from the scope and spirit of the disclosure as set forth in the accompanying claims. These modifications should also be understood to fall within the scope of the present disclosure.

What is claimed is:

1. An electronic apparatus comprising:
    a memory;
    a communication interface;
    a display;
    a microphone; and
    a processor configured to:
        compare a volume of a voice input through the microphone and a standard voice volume stored in the memory, corresponding to size information of a space in which the electronic apparatus is located;
        perform a voice recognition based on the comparison indicating the volume of the voice is greater than the standard voice volume corresponding to the size information of the space;
        based on another electronic apparatus connected through the communication interface indicating detection of the voice, identify whether to perform the voice recognition based on a predetermined priority order;
        based on identifying that the voice recognition on the voice is to be performed, control the display to display a user interface screen requesting a confirmation on whether to perform the voice recognition; and
        based on the confirmation not being received within a set time after displaying the user interface screen, not perform the voice recognition on the voice, and control the communication interface to transmit information to the other electronic apparatus indicating the confirmation has not been received.

2. The electronic apparatus as claimed in claim 1, wherein the processor is further configured to set the predetermined priority order based on at least one from among a placement location of the electronic apparatus and the other electronic apparatus, a recognition result on the voice, and a user manipulation.

3. The electronic apparatus as claimed in claim 1, wherein the processor is further configured to:
    based on the voice being input through the microphone while in a standby mode, activate the communication interface;
    based on identifying that the voice recognition on the voice is to be performed, convert a mode of the electronic apparatus into a normal mode in which an entire configuration of the electronic apparatus is activated; and
    based on identifying that the voice recognition on the voice is not to be performed, inactivate the communication interface.

4. The electronic apparatus as claimed in claim 1, further comprising a sensor configured to sense a size of the space in which the electronic apparatus is located.

5. The electronic apparatus as claimed in claim 1, further comprising a sensor,
    wherein the processor is further configured to, based on the other electronic apparatus connected through the communication interface indicating detection of the voice, identify an utterance direction of a user by using the sensor, and identify whether to perform the voice recognition based on the utterance direction.

6. The electronic apparatus as claimed in claim 1, wherein the communication interface is further configured to receive the size information from a sensor configured to sense a size of the space in which the electronic apparatus is located.

7. The electronic apparatus as claimed in claim 1, wherein the processor is further configured to, based on identifying the voice as a trigger voice, perform the voice recognition without comparing the voice input through the microphone with the standard voice volume.

8. A method for controlling an electronic apparatus, the method comprising:
receiving a voice input through a microphone of the electronic apparatus;
comparing a volume of the voice and a standard voice volume corresponding to size information of a space in which the electronic apparatus is located;
performing a voice recognition based on the comparing indicating the volume of the voice is greater than the standard voice volume corresponding to the size information of the space;
based on another electronic apparatus connected through a communication interface of the electronic apparatus indicating detection of the voice, identifying whether to perform the voice recognition based on a predetermined priority order;
based on identifying that the voice recognition on the voice is to be performed, controlling a display of the electronic apparatus to display a user interface screen requesting a confirmation on whether to perform the voice recognition; and
based on the confirmation not being received within a set time after displaying the user interface screen, not performing the voice recognition on the voice, and controlling the communication interface to transmit information to the other electronic apparatus indicating the confirmation has not been received.

9. The method as claimed in claim 8, further comprising setting the predetermined priority order based on at least one from among a placement location of the electronic apparatus and the other electronic apparatus, a recognition result on the voice, and a user manipulation.

10. The method as claimed in claim 8, further comprising sensing a size of the space in which the electronic apparatus is located.

11. The method as claimed in claim 8, further comprising identifying, based on the other electronic apparatus indicating detection of the voice, an utterance direction of a user, wherein the identifying whether to perform the voice recognition is based on the utterance direction.

12. The method as claimed in claim 8, further comprising receiving the size information from a sensor configured to sense a size of the space in which the electronic apparatus is located.

13. The method as claimed in claim 8, wherein the identifying comprises performing the voice recognition based on identifying the voice as a trigger voice.

14. A non-transitory computer readable recording medium having embodied thereon a program, which when executed by a processor of an electronic apparatus, causes the electronic apparatus to execute a method including:
receiving a voice input through a microphone of the electronic apparatus;
comparing a volume of the voice and a standard voice volume corresponding to size information of a space in which the electronic apparatus is located;
performing a voice recognition based on the comparing indicating the volume of the voice is greater than the standard voice volume corresponding to the size information of the space;
based on another electronic apparatus connected through a communication interface of the electronic apparatus indicating detection of the voice, identifying whether to perform the voice recognition based on a predetermined priority order;
based on identifying that the voice recognition on the voice is to be performed, controlling a display of the electronic apparatus to display a user interface screen requesting a confirmation on whether to perform the voice recognition; and
based on the confirmation not being received within a set time after displaying the user interface screen, not performing the voice recognition on the voice, and controlling the communication interface to transmit information to the other electronic apparatus indicating the confirmation has not been received.

15. An electronic apparatus comprising:
a memory;
a display;
an interface; and
a processor configured to:
perform a voice recognition on a voice signal received through the interface based on a level of the voice signal being greater than a standard voice level stored in the memory, wherein the standard voice level corresponds to size information of a space in which the electronic apparatus is located;
based on another electronic apparatus connected through the interface indicating detection of the voice, identify whether to perform the voice recognition based on a predetermined priority order;
based on identifying that the voice recognition on the voice is to be performed, control the display to display a user interface screen requesting a confirmation on whether to perform the voice recognition; and
based on the confirmation not being received within a set time after displaying the user interface screen, not perform the voice recognition on the voice, and control the interface to transmit information to the other electronic apparatus indicating the confirmation has not been received.

16. The electronic apparatus as claimed in claim 15, wherein the processor is further configured to perform the voice recognition on the voice signal based on the level of the voice signal exceeding the standard voice level and corresponding to a trigger command.

17. The electronic apparatus as claimed in claim 15, wherein the processor is further configured to identify a direction of a user based on the voice signal, and identify whether to perform the voice recognition on the voice signal based on the direction.

18. The electronic apparatus as claimed in claim 15, wherein the processor is further configured to control the interface to notify the other electronic apparatus that the voice signal has been received, receive a notification from the other electronic apparatus indicating whether the other electronic apparatus has received the voice signal, and identify whether to perform the voice recognition on the voice signal based on the notification received from the other electronic apparatus.

19. The electronic apparatus as claimed in claim 18, further comprising a display,
wherein the processor is further configured to identify whether to perform the voice recognition by controlling a confirmation screen to be displayed on the display based on the voice signal being received, and a confirmation voice signal received through the interface.

* * * * *